United States Patent [19]
Betensky

[11] 4,163,604
[45] Aug. 7, 1979

[54] PROJECTION LENS

[75] Inventor: Ellis I. Betensky, Willowdale, Canada

[73] Assignee: U.S. Precision Lens, Inc., Cincinnati, Ohio

[21] Appl. No.: 864,018

[22] Filed: Dec. 23, 1977

[51] Int. Cl.² .............................................. G02B 9/14
[52] U.S. Cl. ...................................... 350/226; 350/189
[58] Field of Search ................................ 350/226, 189

[56] References Cited
U.S. PATENT DOCUMENTS

| 3,194,116 | 7/1965 | Altman | 350/226 |
| 3,438,697 | 4/1969 | Melech | 350/226 |
| 3,944,337 | 3/1976 | Ruben | 350/189 |

Primary Examiner—Paul A. Sacher
Attorney, Agent, or Firm—Delio and Montgomery

[57] ABSTRACT

A three element lens particularly adapted to project an image appearing on a cathode ray tube.

10 Claims, 1 Drawing Figure

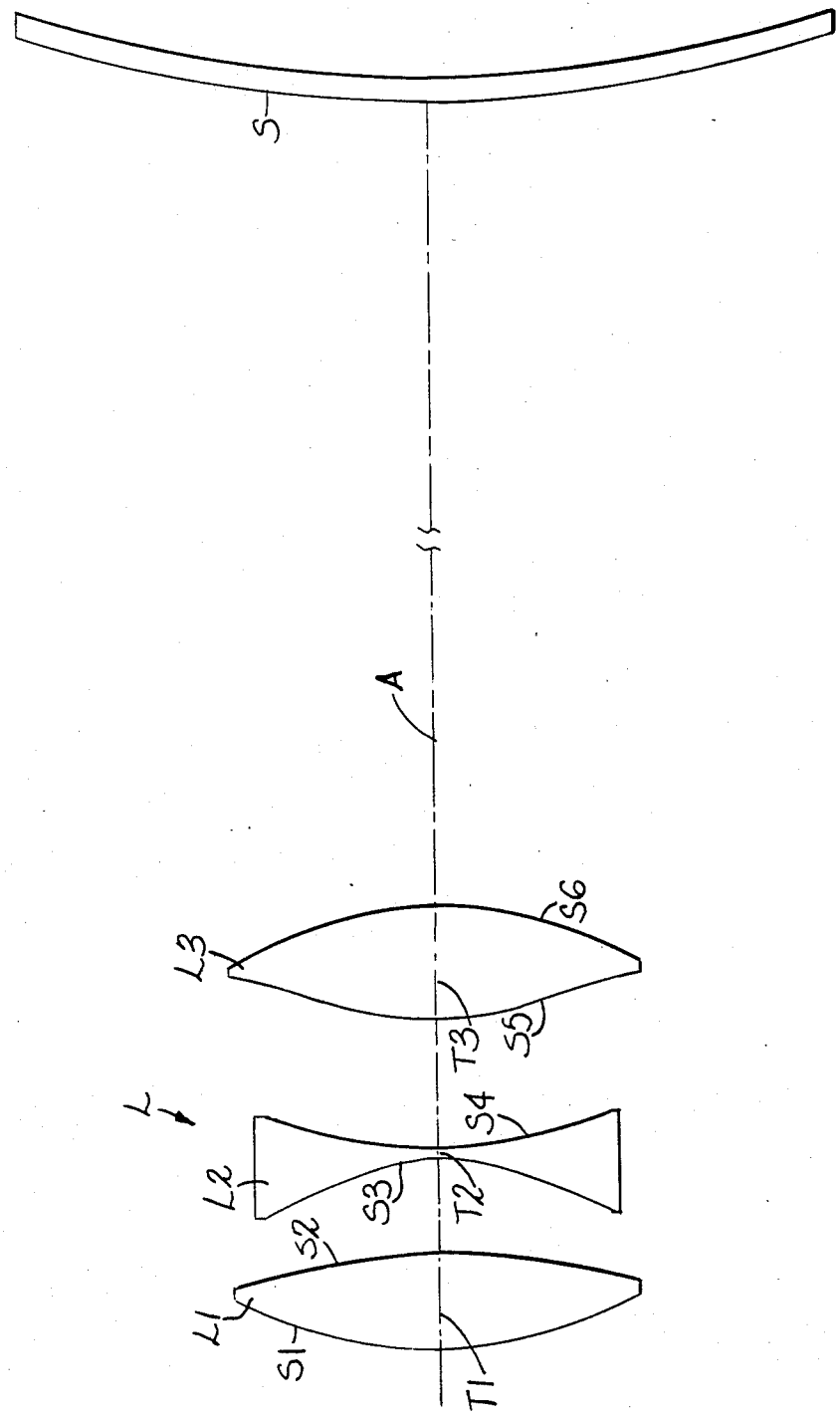

PROJECTION LENS

This invention relates to projection lenses and more particularly relates to lenses adapted to project an enlargement of an image appearing on one or more cathode ray tubes (CRT), such as the screen of a home television set.

A lens designed for projecting the image on a television screen must be corrected for a large aperture, typically in the range of f/2.5 to f/1.2. Additionally, such lens should have a large field of view, the angular coverage being approximately 50°. If not, the dimensional requirements for the projection room or area will be large and may be unacceptable.

To provide an acceptable projection lens for a television system, the lens system must be small in size, inexpensive, and have sufficient relative aperture to project a bright image. Typical focal length of a projection lens for a thirteen inch diagonal television screen would be twelve inches, and the spacing between the lens and screen must be slightly longer than this. It is easily recognizable that conventional lens systems of these charateristics would be very large in both thickness and diameter. In most television sets, the face of the CRT is convex to the viewer presenting a requirement of correcting for field curvature. The conventional approach to reduce field curvature in a television lens projection system is to use a field flattener near the viewing screen of the television. This however, greatly increases the expense of the lens system since the field flattener must be positioned close to the face of the television screen which is relatively large. Even if aspheric elements are used to reduce the number of elements in the conventional approach to the television projection lens, the size of the lens would still be large.

The present invention provides a lens in which the number of elements are reduced to only three in number while still providing correction for field curvature and correction for color if necessary, and the lens is compact in size in relation to the television viewing screen.

A lens embodying the invention comprises three elements in the conventional positive-negative-positive configuration. However, the lenses are designed to be small in size by the use of large element powers. In this manner, the field curvature can be corrected even with the use of low index plastic material, and high relative illumination can be achieved. At least one surface of each element is made aspheric since the large lens powers introduce large aberrations, and will not provide sufficient edge thickness unless large center thicknesses are used. Certain relationships of the elements and the parameters of the lens are chosen to minimize the amount of material in the lens elements and further assure the necessary small size of the lens system.

An object of the invention is to provide a new and improved lens for projecting an image appearing on a cathode ray tube.

Another object of this invention is to provide a lens of the type described which is compact in size and has a large relative aperture.

The features of the invention which are believed to be novel are particularly pointed out and distinctly claimed in the concluding portion of this specification. The invention, however, both as to its operation and organization together with further objects and advantages thereof may best be appreciated by reference to the following detailed description taken in conjunction with the drawing, wherein the single FIGURE is a side elevation of a lens embodying the invention.

A lens L embodying the invention comprises a first biconvex element L1 having surfaces S1 and S2; a second beconcave element L2 having surfaces S3 and S4; and a third biconvex element L3 having surfaces S5 and S6. The lens L is spaced a distance from a cathode ray tube screen S a distance greater than the focal length of the lens. The elements L1, L2, and L3 have thicknesses at the optical axis A of T1, T2 and T3, respectively.

In the lens shown, S2, S3 and S5 have aspheric surfaces defined by the equation $$X = \frac{Cy^2}{1 + \sqrt{1 - (1 + k) C^2 y^2}} + Dy^4 + Ey^6 + Fy^8 + Gy^{10}$$

where X is the surface sag at a semi-aperture distance y from the axis A of the lens. The constant C is the curvature at the optical axis equal to the reciprocal of the radius at the vertex. K is a conic constant and in the following examples is minus one $(-1)$. The radii given for the aspheric surfaces is that at the optical axis A.

The following tables define five examples of the lens having an equivalent focal length of 300 mm.

TABLE I

| | | Radius (mm) | Axial Distance Between Surfaces (mm) | $N_d$ | $V_d$ |
|---|---|---|---|---|---|
| L1 | S1 | 147.7 | | | |
| | | | 29.7 | 1.491 | 57.2 |
| | S2 | −181.5 | | | |
| | | | 34.1 | | |
| L2 | S3 | −70.9 | | | |
| | | | 4.0 | 1.562 | 35.0 |
| | S4 | 225.1 | | | |
| | | | 55.9 | | |
| L3 | S5 | 123.1 | | | |
| | | | 26.8 | 1.491 | 57.2 |
| | S6 | −221.5 | | | |

Aspheric Coefficients

| | S2 | S3 | S5 |
|---|---|---|---|
| D | $.203 \times 10^{-6}$ | $.896 \times 10^{-6}$ | $.368 \times 10^{-6}$ |
| E | $-.127 \times 10^{-10}$ | $-.961 \times 10^{-10}$ | $.366 \times 10^{-10}$ |
| F | $.129 \times 10^{-15}$ | $-.212 \times 10^{-14}$ | $-.169 \times 10^{-14}$ |
| G | $.256 \times 10^{-19}$ | $.101 \times 10^{-17}$ | $-.155 \times 10^{-19}$ |

Relative Aperture f/2.4

| Element Powers | | |
|---|---|---|
| $k_{L1}$ | | 1.75 |
| $k_{L2}$ | | −3.14 |
| $k_{L3}$ | | 1.81 |

TABLE II

| | | Radius (mm) | Axial Distance Between Surfaces (mm) | $N_d$ | $V_d$ |
|---|---|---|---|---|---|
| L1 | S1 | 208.4 | | | |
| | | | 30.5 | 1.491 | 57.2 |
| | S2 | −176.2 | | | |
| | | | 39.9 | | |
| L2 | S3 | −65.2 | | | |
| | | | 4.0 | 1.491 | 57.2 |
| | S4 | 208.4 | | | |
| | | | 53.0 | | |
| L3 | S5 | 126.1 | | | |
| | | | 34.4 | 1.491 | 57.2 |
| | S6 | −186.8 | | | |

Aspheric Coefficients

| | S2 | S3 | S5 |
|---|---|---|---|
| D | $.197 \times 10^{-6}$ | $.100 \times 10^{-5}$ | $-.366 \times 10^{-6}$ |
| E | $-.174 \times 10^{-10}$ | $-.106 \times 10^{-9}$ | $.344 \times 10^{-10}$ |

TABLE II-continued

| | | | |
|---|---|---|---|
| F | $.129 \times 10^{-14}$ | $-.218 \times 10^{-14}$ | $-.102 \times 10^{-14}$ |
| G | $-.36 \times 10^{-19}$ | $.106 \times 10^{-17}$ | $-.549 \times 10^{-19}$ |

Relative Aperture f/2.1

| Element Powers | | |
|---|---|---|
| | $k_{L1}$ | 1.52 |
| | $k_{L2}$ | $-3.02$ |
| | $k_{L3}$ | 1.9 |

TABLE III

| | Radius (mm) | Axial Distance Between Surfaces (mm) | $N_d$ | $V_d$ |
|---|---|---|---|---|
| L1 | S1  188.2 | | | |
| | | 31.9 | 1.491 | 57.2 |
| | S2  $-173.6$ | | | |
| | | 36.6 | | |
| | S3  $-70.1$ | | | |
| L2 | | 4.0 | 1.562 | 35.0 |
| | S4  247.0 | | | |
| | | 53.9 | | |
| | S5  126.1 | | | |
| L3 | | 35.3 | 1.491 | 57.2 |
| | S6  $-186.4$ | | | |

Aspheric Coefficients

| | S2 | S3 | S5 |
|---|---|---|---|
| D | $.214 \times 10^{-6}$ | $.894 \times 10^{-6}$ | $-.366 \times 10^{-6}$ |
| E | $-1.67 \times 10^{-10}$ | $-.943 \times 10^{-10}$ | $.334 \times 10^{-10}$ |
| F | $.852 \times 10^{-15}$ | $-.219 \times 10^{-14}$ | $-.102 \times 10^{-14}$ |
| G | $.201 \times 10^{-19}$ | $.967 \times 10^{-19}$ | $-.549 \times 10^{-19}$ |

Relative Aperture f/2.1

| Element Powers | | |
|---|---|---|
| | $k_{L1}$ | 1.62 |
| | $k_{L2}$ | $-3.14$ |
| | $k_{L3}$ | 1.91 |

TABLE IV

| | Radius (mm) | Axial Distance Between Surfaces (mm) | $N_d$ | $V_d$ |
|---|---|---|---|---|
| L1 | S1  169.7 | | | |
| | | 39.5 | 1.491 | 57.2 |
| | S2  $-188.9$ | | | |
| | | 38.4 | | |
| | S3  $-68.5$ | | | |
| L2 | | 4.0 | 1.491 | 57.2 |
| | S4  169.7 | | | |
| | | 51.8 | | |
| | S5  126.1 | | | |
| L3 | | 46.4 | 1.491 | 57.2 |
| | S6  $-186.8$ | | | |

Aspheric Coefficients

| | S2 | S3 | S5 |
|---|---|---|---|
| D | $.168 \times 10^{-6}$ | $.984 \times 10^{-6}$ | $-.366 \times 10^{-6}$ |
| E | $-.808 \times 10^{-11}$ | $-.128 \times 10^{-9}$ | $.334 \times 10^{-10}$ |
| F | $.201 \times 10^{-16}$ | $.770 \times 10^{-14}$ | $-.109 \times 10^{-14}$ |
| G | $.110 \times 10^{-19}$ | $-.528 \times 10^{-19}$ | $-.549 \times 10^{-19}$ |

Relative Aperture f/1.7

| Element Powers | | |
|---|---|---|
| | $k_{L1}$ | 1.59 |
| | $k_{L2}$ | $-3.04$ |
| | $k_{L3}$ | 1.87 |

TABLE V

| | Radius (mm) | Axial Distance Between Surfaces (mm) | $N_d$ | $V_d$ |
|---|---|---|---|---|
| L1 | S1  186.8 | | | |
| | | 39.5 | 1.491 | 57.2 |
| | S2  $-188.9$ | | | |
| | | 39.8 | | |
| | S3  $-74.5$ | | | |
| L2 | | 4.0 | 1.562 | 35.0 |
| | S4  208.4 | | | |
| | | 53.0 | | |
| | S5  126.1 | | | |
| L3 | | 46.4 | 1.491 | 57.2 |
| | S6  $-169.7$ | | | |

Aspheric Coefficients

| | S2 | S3 | S5 |
|---|---|---|---|
| D | $.168 \times 10^{-6}$ | $.814 \times 10^{-6}$ | $-.366 \times 10^{-6}$ |
| E | $-.808 \times 10^{-11}$ | $-.920 \times 10^{-10}$ | $.334 \times 10^{-10}$ |
| F | $.201 \times 10^{-16}$ | $.132 \times 10^{-14}$ | $-.102 \times 10^{-14}$ |
| G | $.110 \times 10^{-19}$ | $.460 \times 10^{-18}$ | $-.549 \times 10^{-19}$ |

Relative Aperture f/1.7

| Element Powers | | |
|---|---|---|
| | $k_{L1}$ | 1.57 |
| | $k_{L2}$ | $-3.07$ |
| | $k_{L3}$ | 1.92 |

As may be noted from the foregoing examples, the average of the powers of the positive elements is between 1.6 and 1.8, while the absolute value of the negative element is between 3.0 and 3.2, as based on a unity focal length system. Otherwise stated:

$$1.6 < \tfrac{1}{2}(k1+k3) < 1.8$$

and $$3.0 < |k2| < 3.2$$

These conditions permit correction of color, if desired, and correction of field curvature.

To achieve the small size of the lens, the thickness of L1 and L3 should be $$0.22 < F_N(T1+T3) < 0.26$$

where T1 and T3 are the axial thicknesses of L1 and L3 expressed as a fraction of the equivalent focal length, and $F_N$ is the F-number of the lens.

The powers of the lens elements are given in Table VI.

TABLE VI

| Table | L1 | L2 | L3 |
|---|---|---|---|
| I | 1.75 | $-3.14$ | 1.81 |
| II | 1.52 | $-3.02$ | 1.91 |
| III | 1.62 | $-3.14$ | 1.91 |
| IV | 1.59 | $-3.04$ | 1.87 |
| V | 1.51 | $-3.07$ | 1.92 |

The axial thicknesses T1 and T3, respectively, of L1 and L3 expressed as a fraction of equivalent focal length are given in Table VII.

TABLE VII

| T1 | T3 |
|---|---|
| .1 | .09 |
| .1 | .12 |
| .11 | .12 |
| .13 | .15 |
| .13 | .16 |

The specific examples given are sized for projecting an image on a television screen of thirteen inch diagonal measurement. The diameter of the lens systems vary from about 125 mm to 180 mm (EFL/f-No.). The thickest lens assembly (axially) is only 182.7 mm (Table V).

Dimensionally, the lenses are quite compact for their relative aperture and equivalent focal length. The lens will project a bright image of three and one half magnification positioned about 320 mm from the television screen.

The small size of the lens elements are important from the standpoint of economy. The elements will be manufactured of a plastic material such as acrylic, styrene, or an acrylic-styrene copolymer, and the compactness of size contributes to the economy.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A lens comprising three elements, a first biconvex element, a second biconcave element, and a third biconvex element, and further defined by the following relationship $$1.6 < \tfrac{1}{2}(k1+k3) < 1.8$$

$$3.0 < |k2| < 3.2$$

$$0.22 < F_N(T1+T3) < 0.26$$

where k1, k2 and k3 are the powers of the first, second and third elements, respectively; T1 and T3 are the axial thicknesses of the first and third elements as a fraction of the equivalent focal length, and $F_N$ is the F-number of the lens.

2. The lens of claim 1 where one surface of each lens has an aspheric surface.

3. A lens according to claim 1 wherein the first element has surfaces S1 and S2, the second element has surfaces S3 and S4, and the third element has surfaces S5 and S6, and the surfaces S2, S3, and S5 are aspheric in accordance with the following relationship $$X = \frac{Cy^2}{1 + \sqrt{1 - (1+k)C^2y^2}} + Dy^4 + Ey^6 + Fy^8 + Gy^{10}$$

where X is the surface sag at a semi-aperture distance y from the optical axis of the lens, C is the curvature of the surface at the optical axis, K is a conic constant, and D, E, F, and G are constants.

4. A lens according to claim 3 having an equivalent focal length of essentially 299.0 mm and defined substantially as follows:

|  |  | Radius (mm) | Axial Distance Between Surfaces (mm) | $N_d$ | $V_d$ |
|---|---|---|---|---|---|
| L1 | S1 | 147.7 | | | |
|  |  |  | 29.7 | 1.491 | 57.2 |
|  | S2 | −181.5 | | | |
|  |  |  | 34.1 | | |
| L2 | S3 | −70.9 | | | |
|  |  |  | 4.0 | 1.562 | 35.0 |
|  | S4 | 225.1 | | | |
|  |  |  | 55.9 | | |
| L3 | S3 | 123.1 | | | |
|  |  |  | 26.8 | 1.491 | 57.2 |

-continued

|  | Radius (mm) | Axial Distance Between Surfaces (mm) | $N_d$ | $V_d$ |
|---|---|---|---|---|
| S6 | −221.5 | | | | where L1–L3 are the lens elements, $N_d$ is the index of refraction, $V_d$ is the Abbe number, and the constants D, E, F, and G for surfaces S2, S3, and S5 are

|  | S2 | S3 | S5 |
|---|---|---|---|
| D | $.203 \times 10^{-6}$ | $.896 \times 10^{-6}$ | $.368 \times 10^{-6}$ |
| E | $-.127 \times 10^{-10}$ | $-.961 \times 10^{-10}$ | $.366 \times 10^{-10}$ |
| F | $.129 \times 10^{-15}$ | $-.212 \times 10^{-14}$ | $-.169 \times 10^{-14}$ |
| G | $.256 \times 10^{-19}$ | $.101 \times 10^{-17}$ | $-.155 \times 10^{-19}$ |

5. A lens according to claim 3 having an equivalent focal length of essentially 299.0 mm and defined substantially as follows:

|  |  | Radius (mm) | Axial Distance Between Surfaces (mm) | $N_d$ | $V_d$ |
|---|---|---|---|---|---|
| L1 | S1 | 208.4 | | | |
|  |  |  | 30.5 | 1.491 | 57.2 |
|  | S2 | −176.2 | | | |
|  |  |  | 39.9 | | |
| L2 | S3 | −65.2 | | | |
|  |  |  | 4.0 | 1.491 | 57.2 |
|  | S4 | 208.4 | | | |
|  |  |  | 53.0 | | |
| L3 | S5 | 126.1 | | | |
|  |  |  | 34.4 | 1.491 | 57.2 |
|  | S6 | −186.8 | | | | where L1–L3 are the lens elements, $N_d$ is the index of refraction, $V_d$ is the Abbe number, and the constants D, E, F, and G for surfaces S2, S3 and S5 are

|  | S2 | S3 | S5 |
|---|---|---|---|
| D | $.197 \times 10^{-6}$ | $.100 \times 10^{-5}$ | $-.366 \times 10^{-6}$ |
| E | $-.174 \times 10^{-10}$ | $-.106 \times 10^{-9}$ | $.344 \times 10^{-10}$ |
| F | $.129 \times 10^{-14}$ | $-.218 \times 10^{-14}$ | $-.102 \times 10^{-14}$ |
| G | $-.36 \times 10^{-19}$ | $.106 \times 10^{-17}$ | $-.549 \times 10^{-19}$ |

6. A lens according to claim 3 having an equivalent focal length of essentially 299.0 mm and defined substantially as follows:

|  |  | Radius (mm) | Axial Distance Between Surfaces (mm) | $N_d$ | $V_d$ |
|---|---|---|---|---|---|
| L1 | S1 | 188.2 | | | |
|  |  |  | 31.9 | 1.491 | 57.2 |
|  | S2 | −173.6 | | | |
|  |  |  | 36.6 | | |
| L2 | S3 | −70.1 | | | |
|  |  |  | 4.0 | 1.562 | 35.0 |
|  | S4 | 247.0 | | | |
|  |  |  | 53.9 | | |
| L3 | S5 | 126.1 | | | |
|  |  |  | 35.3 | 1.491 | 57.2 |
|  | S6 | −186.5 | | | | where L1–L3 are the lens elements, $N_d$ is the index of refraction, $V_d$ is the Abbe number, and the constants D, E, F, and G for surfaces S2, S3 and S5 are

|   | S2 | S3 | S5 |
|---|---|---|---|
| D | $.214 \times 10^{-6}$ | $.894 \times 10^{-6}$ | $-.366 \times 10^{-6}$ |
| E | $-.167 \times 10^{-10}$ | $-.943 \times 10^{-10}$ | $.334 \times 10^{-10}$ |
| F | $.852 \times 10^{-15}$ | $-.219 \times 10^{-14}$ | $-.102 \times 10^{-14}$ |
| G | $.201 \times 10^{-19}$ | $.967 \times 10^{-19}$ | $-.549 \times 10^{-19}$ |

7. A lens according to claim 3 having an equivalent focal length of essentially 299.0 mm and defined substantially as follows:

|   |   | Radius (mm) | Axial Distance Between Surfaces (mm) | $N_d$ | $V_d$ |
|---|---|---|---|---|---|
| L1 | S1 | 169.7 | | | |
|   |   |   | 39.5 | 1.491 | 57.2 |
|   | S2 | $-188.9$ | | | |
|   |   |   | 38.4 | | |
| L2 | S3 | $-68.5$ | | | |
|   |   |   | 4.0 | 1.491 | 57.2 |
|   | S4 | 169.7 | | | |
|   |   |   | 51.8 | | |
| L3 | S5 | 126.1 | | | |
|   |   |   | 46.4 | 1.491 | 57.2 |
|   | S6 | $-186.8$ | | | | where L1–L3 are the lens elements, $N_d$ is the index of refraction, $V_d$ is the Abbe number, and the constants D, E, F, and G for surfaces S2, S3 and S5 are

|   | S2 | S3 | S5 |
|---|---|---|---|
| D | $.168 \times 10^{-6}$ | $.984 \times 10^{-6}$ | $-.366 \times 10^{-6}$ |
| E | $-.808 \times 10^{-11}$ | $-.128 \times 10^{-9}$ | $.334 \times 10^{-10}$ |
| F | $.201 \times 10^{-16}$ | $.770 \times 10^{-14}$ | $-.109 \times 10^{-14}$ |
| G | $.110 \times 10^{-19}$ | $-.528 \times 10^{-19}$ | $-.549 \times 10^{-19}$ |

8. A lens according to claim 3 having an equivalent focal length of essentially 299.0 mm and defined substantially as follows:

|   |   | Radius (mm) | Axial Distance Between Surfaces (mm) | $N_d$ | $V_d$ |
|---|---|---|---|---|---|
| L1 | S1 | 186.8 | | | |
|   |   |   | 39.5 | 1.491 | 57.2 |
|   | S2 | $-188.9$ | | | |
|   |   |   | 39.8 | | |
| L2 | S3 | $-74.5$ | | | |
|   |   |   | 4.0 | 1.562 | 35.0 |
|   | S4 | 208.4 | | | |
|   |   |   | 53.0 | | |
| L3 | S5 | 126.1 | | | |
|   |   |   | 46.4 | 1.491 | 57.2 |
|   | S6 | $-169.7$ | | | | where L1–L3 are the lens elements, $N_d$ is the index of refraction, $V_d$ is the Abbe number, and the constants D, E, F, and G for surfaces S2, S3 and S5 are

|   | S2 | S3 | S5 |
|---|---|---|---|
| D | $.168 \times 10^{-6}$ | $.819 \times 10^{-6}$ | $-.366 \times 10^{-6}$ |
| E | $-.808 \times 10^{-11}$ | $-.920 \times 10^{-10}$ | $.334 \times 10^{-10}$ |
| F | $.201 \times 10^{-16}$ | $.132 \times 10^{-14}$ | $-.102 \times 10^{-14}$ |
| G | $.110 \times 10^{-19}$ | $.460 \times 10^{-18}$ | $-.549 \times 10^{-19}$ |

9. A lens consisting of three elements, a first biconvex element, a second biconcave element, and a third biconvex element, each of said elements having at least one aspheric surface and further defined by the following relationship $$1.6 < \tfrac{1}{2}(k1 + k3) < 1.8$$

$$3.01 \; k2 < 3.2$$

where k1, k2 and k3 are the powers of the first, second, and third elements, respectively.

10. The lens of claim 9 further defined by $$0.22 < F_N(T1 + T3) < 0.26$$

where $F_N$ is the F-number of the lens and T1 and T3 are the thicknesses of the first and third elements at the optical axis.

* * * * *

UNITED STATES PATENT AND TRADEMARK OFFICE
CERTIFICATE OF CORRECTION

PATENT NO. : 4,163,604
DATED : August 7, 1979
INVENTOR(S) : Ellis I. Betensky

It is certified that error appears in the above-identified patent and that said Letters Patent are hereby corrected as shown below:

Column 3, line 27, (under S2), "-1.67" should read -- -.167--.

Column 4, line 11, (under S3), ".814" should read --.819--.

Column 5, line 68, in the Table, under the heading "Radius (mm)", "S3" should read --S5--.

Column 6, line 64, under the heading "Radius (mm)", "-186.5" should read -- -186.4--.

Signed and Sealed this

Twentieth Day of November 1979

[SEAL]

Attest:

RUTH C. MASON
Attesting Officer

LUTRELLE F. PARKER
Acting Commissioner of Patents and Trademarks